Jan. 16, 1962    G. A. WOOD, JR    3,017,135
FISHING REEL
Filed Nov. 20, 1957    2 Sheets-Sheet 2
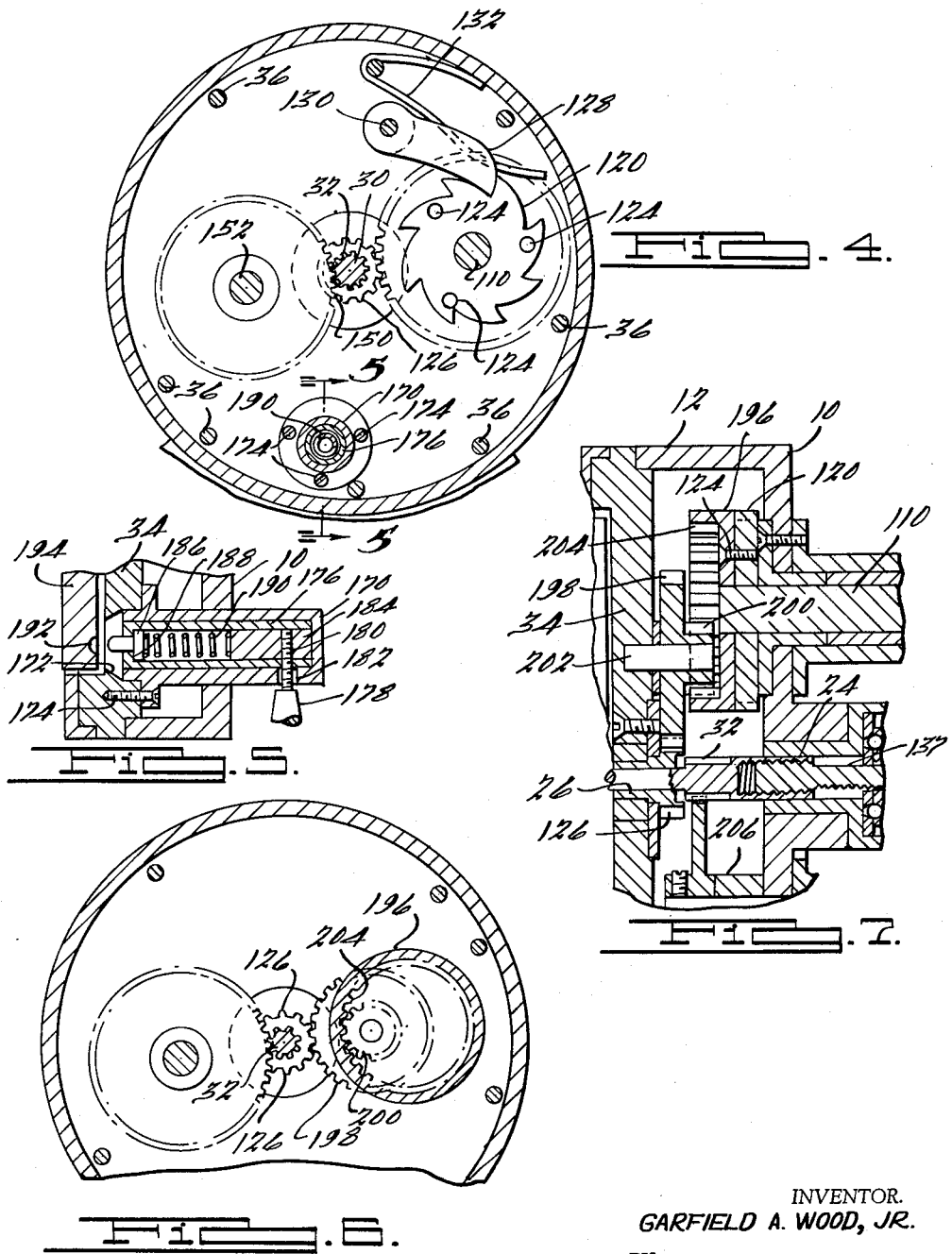
INVENTOR.
GARFIELD A. WOOD, JR.

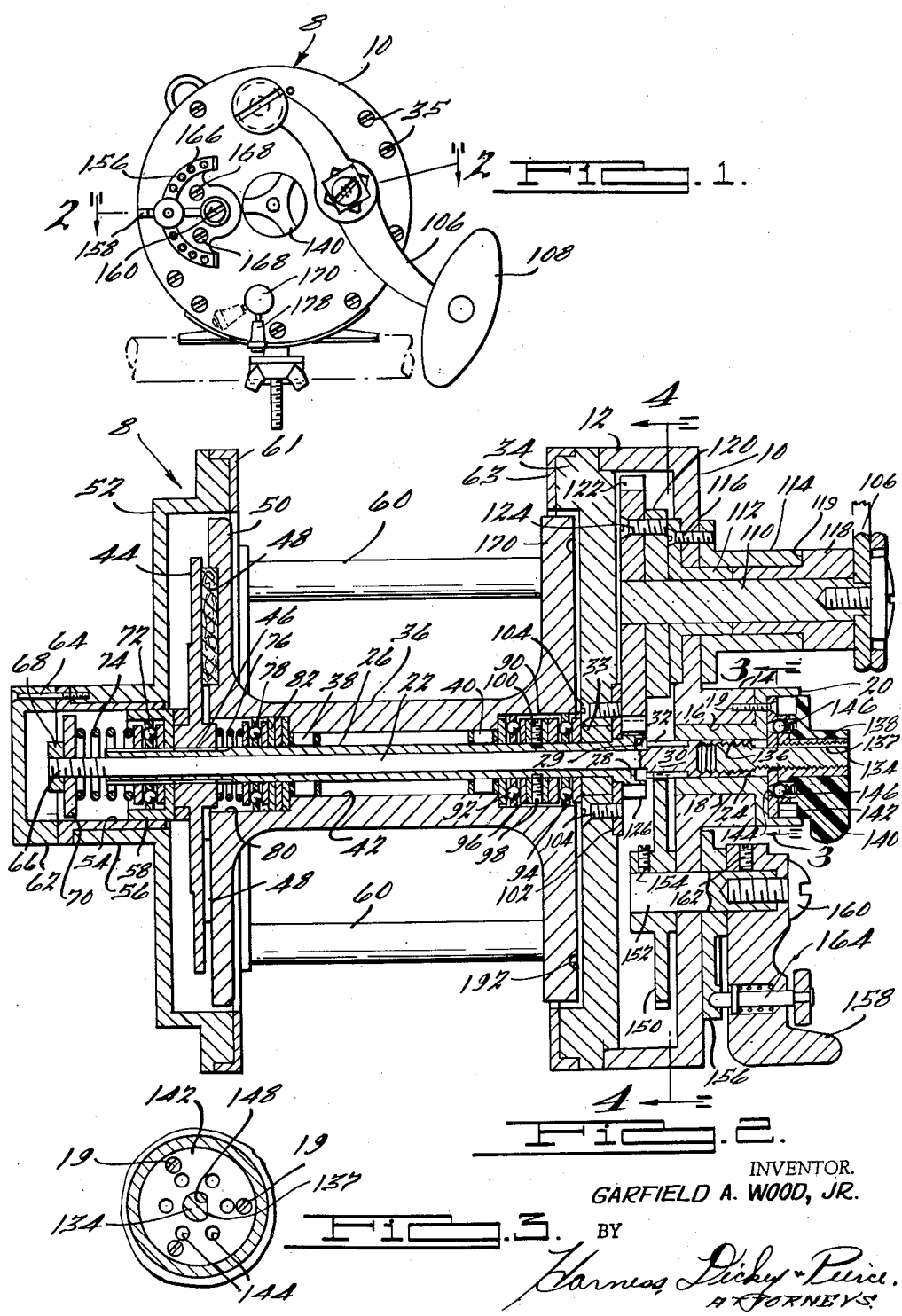

United States Patent Office 3,017,135
Patented Jan. 16, 1962

3,017,135
FISHING REEL
Garfield A. Wood, Jr., Miami, Fla. (4565 Sable Palm Road, Bay Pointe, Fla.)
Filed Nov. 20, 1957, Ser. No. 697,670
14 Claims. (Cl. 242—84.54)

This invention relates to fishing reels and particularly to a fishing reel having a brake thereon to help fight a running fish.

It is one object of the invention to provide a fishing reel having a brake adapted to frictionally engage the spool of the reel in a manner to provide a maximum braking area.

It is another object of the invention to provide a fishing reel having a brake adapted to frictionally engage the spool of the reel on the side furthest removed from the gear mechanism for rotating the spool.

It is a further object of the invention to provide a fishing reel having a brake adapted to frictionally engage one side of the spool of the reel, an adjustable mechanism which enables the maximum frictional engagement between the brake and the spool to be preset, and an additional quick acting mechanism for quickly engaging and disengaging the brake, as well as, applying varying amounts of braking pressure up to the maximum preset braking pressure.

It is a still further object of the invention to provide a fishing reel having a brake disc adapted to frictionally engage brake pads mounted on one side of the spool of the reel so as to permit the brake disc to be made of relatively hard material and the spool to be made of relatively light material to increase the life of the brake disc and to reduce the inertia of the spool to minimize the over-running and backlash tendencies of the spool.

It is a still further object of the invention to provide a brake for a fishing reel which is relatively inexpensive to manufacture, simple in design, and rugged and effective in use.

Other objects and features of novelty of the invention will be specifically pointed out or otherwise become apparent when referring, for a better understanding of the invention, to the following description taken in conjunction with the accompanying drawings, wherein:

FIGURE 1 is an end view of a fishing reel construction embodying features of the invention;

FIG. 2 is an enlarged sectional view of the structure illustrated in FIG. 1, taken along the line 2—2 thereof;

FIG. 3 is a sectional view of the structure illustrated in FIG. 2, taken along the line 3—3 thereof;

FIG. 4 is a reduced sectional view of the structure illustrated in FIG. 2, taken along the line 4—4 thereof, FIG. 5 is a broken enlarged sectional view of the structure illustrated in FIG. 4, taken along the line 5—5 thereof;

FIG. 6 is a broken sectional view of structure similar to that of FIG. 4, illustrating a modification of the invention; and FIG. 7 is a broken sectional view of structure similar to that of FIG. 2, illustrating the modification of the invention.

Referring to FIGS. 1 through 4, a fishing reel 8 illustrating one embodiment of the present invention is comprised of a right-hand housing 10 having a cylindrical wall portion 12 and a boss 14 projecting outwardly from the center thereof with an aperture 16 therein. A bushing 18 with an enlarged cylindrical portion 20 on one end thereof is disposed within the aperture 16.

A circular cover plate 34 abuts against the periphery of the cylindrical wall portion 12 of the housing 10 to provide an end closure therefor and is secured to the housing 10 by a plurality of long bolts 35. A shaft 22 extends through the cover plate 34 and has an internally threaded cylindrical portion 24 on one end thereof rotatably supported within the bushing 18. A hollow shaft 26 is disposed over the shaft 22 with one end thereof rotatably supported on the cover plate 34 by a bushing 33. It will be observed that an enlarged portion 28 is formed on the one end of the hollow shaft to prevent movement to the left and to permit a counterbore 29 to be formed therein to receive an enlarged portion 30 of the shaft 22 having gear teeth 32 machined thereon for a purpose which will be described in greater detail hereinafter.

A spool 36 adapted to receive the windings of a fishing line (not shown) is rotatably mounted on the hollow shaft 26 by a pair of spaced-apart bushings 38 and 40 disposed within a bore 42 extending through the spool. A brake disc 44 is slidably keyed with a loose fit to the hollow shaft 26 by an elongated splined portion 46 on the end of the hollow shaft 26, the brake disc 44 being adapted to frictionally engage three spaced-apart braking pads 48 mounted on the outer face of side wall 50 of the spool 36. The brake disc is mounted on the splined portion on the end of the hollow shaft 26 with the aforesaid loose fit so that it is free to swivel a slight amount on the shaft rather than being rigidly mounted thereon to insure an even braking action between each of the brake pads 48 and the brake disc 44. With this construction, if a portion of the brake disc contacts one of the brake pads first the loose fit will permit the disc to turn slightly to permit the remainder of the disc to engage the other brake pads. This is an important feature since it insures that all brake pads 48 are engaged evenly to prevent a sudden binding that might cause the fishing line to snap.

A left-hand housing 52 having a radially flanged bushing 54 disposed within a cylindrical wall portion 56 extending from the center thereof is rigidly connected to the housing 10 and cover plate 34 by a plurality of spacing rods 60 extending therebetween at spaced points about the peripheries thereof. Hard metal rings 61 and 63 are also disposed about the periphery of the housing 52 and cover plate 34 to serve as wearing surfaces and are retained in position by the rods 60. The rods 60 are secured to the cover plate 34 and ring 63 by the bolts 35, and to the housing 52 and ring 61 by a plurality of suitable bolts (not shown). In this manner the housing 52 is maintained rigid and fixed relative to the housing 10. A cup-shaped bushing 58 is mounted on the splined end of the hollow shaft and is disposed within and free to rotate relative to the bushing 54 to provide a rotatable end support for the hollow shaft 26. A suitable cap 62 is secured to the cylindrical wall portion 56 of the end cover 52 to enclose the end thereof by a plurality of screws 64 which also extend through the radially flanged portion of the bushing 54 to prevent the bushing from rotating relative to the cylindrical wall portion 56.

It will be observed that the end of the shaft 22 extends beyond the splined end of the hollow shaft 26 and has a threaded portion 66 with a nut 68 screwed thereon to serve as a stop for a washer 70 disposed over the end of the shaft 22. A suitable thrust bearing 72 is disposed within the cup-shaped bushing 58 and a relatively heavy-duty spring 74 is disposed between the thrust washer 70 and the thrust bearing 72 so as to urge the cup-shaped bushing 58 to the right which in turn forces the brake disc 44 against the brake pads 48. A relatively light-duty spring 76 and thrust bearing 78 are disposed within a counterbore 80 in the spool 36 so that the spring 76 exerts an outward force on the brake disc 44 to normally maintain it disengaged from the brake pads 48 when the relatively heavy-duty spring 74 is not under sufficient compression. Suitable spacers 82 may be provided between the thrust bearing 78 and bottom of the counterbore 80 to take up the space therebetween and to adjust the compression of the spring 76 as required. A second counterbore 90 is formed on the opposite side of the spool 36 and two thrust bearings 92 and 94 are disposed within the counterbore 90 and are spaced apart by an adjustable stop 96, the stop 96 being fixed relative to the hollow shaft 26 by setscrews 98 and 100.

With this construction the relatively heavy-duty spring 74 can be compressed by moving the shaft 22 to the right as viewed in FIG. 2 which urges the brake disc 44 against the brake pads 48 which in turn urges the spool 36 to the right. However, movement of the spool 36 to the right is prevented by the stop 96 with the thrust bearing 92 permitting relative rotation therebetween. When the shaft 22 moves to the right, the housing 10 and cover plate 34 tend to be urged to the left, as will be described in greater detail hereinafter, which tendency is also prevented by the stop 96 with the thrust bearing 94 permitting relative rotation therebetween. It will be observed that a washer 102 is secured to the right-hand face of the cover plate 34 by screws 104 in a manner to prevent the movement of the bushing 33 to the right when the end cover 34 and housing 10 are urged to the left.

In the construction just described, it will be observed that the spool 36 is at all times free to rotate relative to the shaft 26 unless the brake disc 44 frictionally engages the brake pads 48, it being apparent that when this occurs rotation of the spool would be prevented to the extent of the frictional engagement since the brake disc 44 is keyed to the hollow shaft by the splined portion 46. Conversely, it is apparent that the rotation of the spool to reel in the fishing line can only be accomplished through the braking friction applied between the brake disc 44 and the brake pads 48, the brake disc being rotated by the hollow shaft 26 to which it is keyed. To rotate the hollow shaft, a conventional handle 106 having a freely rotating knob 108 on one end thereof is fixed to a shaft 110 which is rotatably mounted on the housing 10 by a radially flanged bushing 112. It will be observed that a second radially flanged bushing 114 is disposed on the outside of the housing 10 and that a plurality of bolts 116, one of which is illustrated, secure the radial flanges of the bushings 112 and 114 to the housing 10. A third bushing 118 having a shoulder 119 thereon engaging the ends of the bushing 114 completes the support for the shaft 110. A ratchet wheel 120 and gear 122 joined together by a plurality of screws 124, one of which is shown, are fixed to the end of the shaft 110 disposed within the housing 10 so that the teeth of the gear 122 mesh with the teeth of a pinion gear 126 fixed to the enlarged portion 28 on the end of the hollow shaft 26. By this construction, rotation of the shaft 110 by the handle 106 in a clockwise direction as viewed in FIG. 4 will rotate the gear 122 which in turn rotates the gear 126 and consequently the shaft 26. Rotation of the hollow shaft 26 will, as previously explained, rotate the spool through the frictional engagement between the brake disc keyed to the splined portion 46 and the brake pads 48 on the side wall 50 of the spool.

As most clearly illustrated in FIG. 4, a pawl 128 is pivotally mounted on the cover plate 34 by a pin 130 and is spring urged into engagement with the teeth of the ratchet wheel 120 by a spring 132. The ratchet wheel 120 and pawl 128 permit rotation of the handle 106 and shaft 110 in a clockwise direction to reel in the fishing line but prevent rotation thereof in a counterclockwise direction. Consequently, the spool is prevented from rotating in a clockwise direction as viewed in FIG. 4, since this would tend to rotate the ratchet wheel 120 in a counterclockwise direction, unless a force is applied on the spool by a fish tugging on the line, for example, which is sufficient to overcome the frictional engagement between the disc 44 and the brake pads 48. If this occurs, the spool will rotate relative to the hollow shaft 26 to prevent the fish from breaking the line.

In order to vary the maximum braking pressure that can be applied through the frictional engagement between the brake disc and pads, a short stub shaft 134 is provided having relatively coarse threads 136 on the portion thereof engaging the internal threads of the enlarged cylindrical portion 24 on the end of the shaft 22. The other end of the stub shaft 134 is also threaded with a flat 137 formed thereon to provide a D-shaped cross section, as most clearly illustrated in FIG. 3, and is threadably engaged by an internally threaded radially flanged bushing 138 which is press fit within an aperture in a knob 140. A detent disc 142 having a plurality of detent holes 144 therein is fastened to the bushing 18 and to the boss 14 of the housing 10 by a plurality of screws 19 so that it is fixed against rotation relative to the bushing and housing. Two spring-mounted balls 146 are disposed within the radially flanged portion of the bushing 138 to releasably engage the holes 144 in the detent disc 142 to provide an indication of the position of the knob 140 relative to the detent disc 142. As most clearly illustrated in FIG. 3, it will be observed that the detent disc 142 has a D-shaped aperture 148 therein which cooperates with the D-shaped cross section of the stub shaft 134 to prevent the rotation thereof relative to the housing 10. Therefore, when the knob 140 is rotated the stub shaft 134 and shaft 22 move axially to the right or left, as viewed in FIG. 2, depending on the direction of rotation of the knob 140 to compress or decompress the relatively heavy-duty spring 74 on the other end of the shaft 22 to increase or decrease the frictional engagement between the brake disc 44 and the brake pads 48.

However, by virtue of the coarse threaded connection between the enlarged cylindrical portion 24 of the shaft 22 and the threads 136 on the end of the stub shaft 134, the frictional engagement between the brake disc 44 and brake pads 48 can be varied by rotating a gear 150 which meshes with the gear teeth 32 on the enlarged portion 30 of the shaft 22 to rotate the shaft 22. Since the stub shaft 134 is prevented from rotating by the detent disc 142 and since the enlarged cylindrical portion 24 on the end of the shaft 22 is threadably engaged with the coarse threads 136 of the stub shaft, the rotation of the shaft 22 by the gear 150 will cause the shaft to move axially depending upon the direction of rotation thereof.

The gear 150 is mounted on a pin 152 by any suitable means, such as a setscrew 154, and the other end of the shaft 152 extends through the housing 10, through a detent sector member 156, and into a handle 158, the handle 158 being secured to the end of the shaft 152 by a screw 160 and being prevented from rotating relative thereto by any suitable means, such as a setscrew 162. A spring-mounted plunger 164 is disposed in the handle 158 in position to engage a plurality of detents 166, most clearly shown in FIG. 1, to indicate the position of the handle 158 relative to the detent sector which in turn determines the position of rotation of the shaft 22 and enlarged cylindrical portion 24 relative to the stub shaft 134 and, as previously explained, this in turn determines the frictional engagement of the brake disc 44. The detent sector 156 is, of course, secured rigidly to the housing 10 by any suitable means, such as screws 168.

To summarize the operation of the brake feature of the fishing reel 8, the knob 140 is rotated to move the stub shaft 134 axially, which in turn moves the shaft 22 axially to vary the compression of the heavy-duty spring 74 to adjust what may be termed the maximum braking pressure. Once this adjustment has been made, variations in the braking pressure may thereafter be made by simply pivoting the handle 158. The position of the stub shaft 134 is preferably set relative to the enlarged cylindrical portion 24 so that when the handle 158 is pivoted to its extreme lower position as viewed in FIG. 1, the compression on the spring 74 will be sufficiently relieved to permit the light-duty spring 76 to disengage the brake disc 44 from the brake pads 48. With the brake disc in this position, which may be termed the casting position, the spool 36 is free to rotate relative to the hollow shaft 26. By merely pivoting the handle 158 in a clockwise manner as viewed in FIG. 1, the braking pressure of the disc 44 may be increased until the handle 158 reaches its uppermost position at which time the maximum braking pressure is applied. This feature permits the fisherman to quickly apply varying amounts of braking pressure by simply pivoting the handle 158 while still insuring that a certain preset maximum pressure cannot be exceeded. As previously explained, the braking pressure applied at the uppermost position of the handle 158 will depend upon the axial position of the stub shaft 134 which is independently determined by the adjustment of the knob 140.

In order to initially adjust the brake feature of the fishing reel 8 so that movement of the handle 158 from its lowermost position to its uppermost position will move the brake disc from a position of disengagement with the brake pads 48 to a position of maximum frictional engagement therewith, the handle 158 is moved to its uppermost position before the stub shaft 134 is connected to the enlarged cylindrical portion 24. With the handle 158 in this position, the stub shaft 134 is then screwed into the cylindrical portion 24 until the end thereof contacts the bottom of the cylindrical portion and then backed off a turn or so so that it is clear of the bottom of the cylindrical portion.

The detent disc 142 with the D-shaped aperture 148 is then positioned over the end of the stub shaft having the flat 137 and secured to the bushing 18 and housing 10 by any suitable means such as the screws 19. The knob 140 with the internally threaded bushing 138 press fit therein may then be screwed onto the end of the stub shaft 134 until the detent balls 146 engage the detent 144 in the detent disc 142. Thereafter, further rotation of the knob 140 will move the stub shaft 134 axially to the right as viewed in FIG. 2 which as previously explained, pulls the shaft 22 to the right to compress the heavy-duty spring 74 to urge the brake disc 44 against the brake pads 48. In this manner the maximum desired brake pressure may be preset which means that at any time a fish exerts a greater force on the fishing line than this preset braking pressure, the spool 36 will rotate relative to the brake disc so that the fish will not snap the line.

Once this desired maximum braking pressure has been preset, the handle 158 may be pivoted to its lowermost position which rotates the gear 150 in a counterclockwise direction and the gear teeth 32 and shaft 22 in a clockwise direction when viewed from the right in FIG. 2. This will move the shaft 22 axially to the left as viewed in FIG. 2 to decompress the relatively heavy-duty spring 74 and permit the light-duty spring 76 to disengage the brake disc 44 from the brake pads 48 to permit the spool 36 to rotate freely on the hollow shaft 26. As previously explained, this may be termed the casting position.

Of course, it is to be understood that once the stub shaft 134 has been connected to the shaft 22 as described above, the movement between the cylindrical portion 24 and the coarse threads 136 of the stub shaft resulting from pivoting the handle 158 is not great enough to permit the stub shaft to become disconnected. Further, the stub shaft may be subsequently moved axially by the rotation of the knob 140 to vary the maximum braking pressure desired since this in no way affects the position of the stub shaft relative to cylindrical portion 24 of the shaft 22.

Referring to FIGS. 4 and 5, a cylindrical housing 170 projects partially within an aperture 172 in the cover plate 34 and is secured to the cover plate by a plurality of screws 174 or the like, the other end of the cylindrical housing 170 projecting through a suitable aperture in the housing 10. A sleeve 176 is slidably disposed within the cylindrical housing 170 and is adapted to be axially positioned relative thereto by a knob 178 having a pin 180 thereon which projects through a spiral camming groove 182 in the wall of the cylindrical housing 170 and is secured to the end of the sleeve 176 and a plug 184 therein. A suitable plunger 186 is disposed in the other end of the sleeve and retained by a shoulder 188 on the end of the sleeve and is urged to the left by a spring 190 disposed between the plug 184 and the plunger 186. A plurality of detents 192 are provided in the face of the right-hand side wall 194 of the spool 36 in an arcuate manner adjacent the periphery thereof.

With this construction, the sleeve 176 can be moved to the left by rotating it with the handle 178 so that the pin 180 engages the spiral camming groove 182 in a manner to cam the sleeve 176 to the left until the end of the plunger 186 is in the position to engage the detents 192. Thereafter whenever the spool 36 rotates relative to the cover plate 34 the spring-mounted plunger will click into and out of the detents 192 to serve as a noisemaker to alert the fisherman. In this manner, the fisherman can move the spring-mounted plunger 186 into and out of engagement with the detent to obtain the noisemaker feature when he desires, the noisemaker feature being useful for attracting the fisherman's attention when a fish is caught and begins to run out the fishing line which moves the spool relative to the cover plate 34.

Referring to FIGS. 6 and 7, a modification of the invention is illustrated wherein the gear 122 is replaced by an internal gear 196 which is fixed to the ratchet wheel 120 by screws 124 as was the gear 122. An idler gear 198 having a small pinion gear 200 coaxially mounted thereon is rotatably mounted on a shaft 202 projecting from the cover plate 34. The pinion gear 200 projecting from the idler gear 198 is adapted to mesh with internal teeth 204 of the internal gear 196, and the teeth of the gear 198 are adapted to mesh with the pinion gear 126 mounted on the end of the hollow shaft 26.

With this construction, the rotation of the shaft 110 and the internal gear 196 by the handle 106 in a clockwise direction as viewed in FIG. 6 will also rotate the pinion gear 200 and the gear 198 in a clockwise direction which will in turn rotate the gear 126 and the hollow shaft 26 in a counterclockwise direction which is the same direction that the gear 122 rotated the gear 126 and hollow shaft 26. However, because of the gear ratio between the internal gear 196 and the pinion gear 200, and the ratio between the gear 198 and the gear 126, a higher overall gear ratio is obtained so that rotation of the shaft 110 by the handle 106 a given number of turns will rotate the hollow shaft 26 a greater number of turns than in the embodiment disclosed in FIG. 2.

Further, it is apparent that by employing the internal gear 196 the resulting higher gear ratio is made possible without any appreciable increase in size of the housing 10. This is an extremely important feature in fishing reels since the size of the reel should be maintained as small as possible to insure that the spool in turn is maintained as small as possible so as to reduce the inertia of the rotating spool. As is well known, spools having less inertia have less tendency to over-run and also fewer backlash problems.

The remainder of the construction of this embodiment of the fishing reel is the same as the embodiment previously described with the exception that the cylindrical wall portion 12 of the housing 10 is increased in length to accommodate the added thicknesses of the idler gear 198 and the internal gear 196, and a spacing boss 206 must be provided between the housing 10 and the gear 150 which engages the gear teeth 32 on enlarged portion 30 of the shaft 22 so that the gear 150 will mesh with the gear teeth 32. In addition, the end of the stub shaft 134 having the flat 137 therein is lengthened to insure a good threaded engagement with the knob 140 or, as an alternative, the cylindrical portion 24 of the shaft 22 can be lengthened to accommodate for the aforementioned added length of the cylindrical wall portion 12 of the housing 10.

While it will be apparent that the embodiments of the invention herein disclosed are well calculated to fulfill the objects of the invention, it will be appreciated that the

What is claimed is:

1. A fishing reel comprising two spaced apart housings rigidly connected together, a hollow shaft extending between said housings with the ends thereof disposed within and rotatably supported by the housings, a spool having parallel spaced outer sides rotatably mounted on the hollow shaft, gear means on one of said housings for rotating the hollow shaft, a clutch disc disposed within the other of said housings and slidably keyed to the end of the hollow shaft disposed within said other housing, a rod extending through the hollow shaft and having a head threaded on the end thereof disposed within said other housing and having an internally threaded aperture at the opposite end, spring means disposed between said head and the clutch disc, an externally threaded stub shaft connected to the threaded aperture at the other end of said rod and disposed within said one housing, means for preventing the rotation of said stub shaft, and an internally threaded knob screwed onto the stub shaft and bearing against said one housing to prevent movement of the knob toward said other housing whereby the knob can be rotated to preset the axial position of said rod to determine the maximum frictional engagement between the clutch disc and the side of the spool adjacent thereto.

2. The subject matter as claimed in claim 1 wherein said rod has gear teeth formed thereon adjacent the internally threaded end, and additional gear means rotatably mounted on said housing and engaging said gear teeth for rotating said rod to vary its axial position independently of said internally threaded knob to resiliently urge the clutch disc into and out of frictional engagement with the spool.

3. The subject matter as claimed in claim 2 wherein said additional gear means comprises a pin extending through and rotatably supported on said one housing, a gear disposed within said housing so as to mesh with said gear teeth and secured to the end of the pin, a handle fixed to the other end of the pin projecting from the housing, a detent plate mounted on said one housing beneath said handle, and a spring mounted plunger mounted on said handle for releasably engaging said detent plate so as to indicate the position of the handle which in turn indicates the frictional engagement of the clutch disc with the spool.

4. In a fishing reel, a pair of spaced end plates secured together in spaced relation, a hollow shaft rotatably supported by said plates, a spool mounted for rotation on said hollow shaft, means for driving said hollow shaft in rotation, a drag clutch axially movable on one end of said hollow shaft in driving relation therewith, a rod extending through said hollow shaft, spring means acting between the drag clutch and the end of said rod adjacent to said one end of the hollow shaft, preset means for moving said rod axially for loading said spring means to move said drag clutch toward the adjacent face of said spool to preset the maximum spring loading, and cam means for moving said rod axially to vary the spring loading within the maximum loading established by said preset means without changing the setting of the preset means.

5. In a fishing reel, a pair of spaced end plates secured together in spaced relation, a hollow shaft rotatably supported by said plates, a spool mounted for rotation on said hollow shaft, means for driving said hollow shaft in rotation, a drag clutch axially movable on one end of said hollow shaft in driving relation therewith, a rod extending through said hollow shaft, spring means acting between the drag clutch and the end of said rod adjacent to said one end of the hollow shaft, preset means for moving said rod axially for loading said spring means to move said drag clutch toward the adjacent face of said spool to preset the maximum spring loading, a rotatable bushing, camming means for moving said bushing axially when said camming means and bushing are relatively rotated, and inter-engaging means between said rod and said bushing to cause the rod to move axially in response to the axial movement of the bushing to vary the spring loading within the maximum established by said preset means.

6. In a fishing reel, a pair of spaced end plates secured together in spaced relation, a hollow shaft rotatably supported by said plates, a spool mounted for rotation on said hollow shaft, means for driving said hollow shaft in rotation, a drag clutch axially movable on one end of said hollow shaft in driving relation therewith, a rod extending through said hollow shaft, spring means acting between the drag clutch and the end of said rod adjacent to said one end of the hollow shaft, a stub shaft threadably connected to the other end of said rod, means for preventing the rotation of said stub shaft, means for adjusting the stub shaft axially to preset the maximum loading on said spring means, and means for rotating said rod relative to said stub shaft to cause the rod to move axially relative to the stub shaft by virtue of the threaded connection therebetween and thereby vary the spring loading within the maximum loading established by the axial position of the stub shaft without changing the axial position of the stub shaft.

7. The subject matter as claimed in claim 6 wherein said stub shaft is screwed into an internally threaded aperture in said other end of said rod and said rod has gear teeth formed thereon adjacent to the same end thereof, and said means for rotating said rod including gear means having teeth engaging said gear teeth for rotating said rod.

8. The subject matter as claimed in claim 7 wherein said means for adjusting the stub shaft axially comprises a knob screwed onto the outer end of said stub shaft and bearing against an outwardly presenting surface on the end plate adjacent thereto to prevent axial movement of the stub shaft and knob toward said drag clutch, said spring means resiliently retaining said knob in engagement with said surface whereby the rotation of said knob presets the axial position of said stub shaft to determine the maximum spring loading on the drag clutch.

9. In a fishing reel, a pair of spaced end plates secured together in spaced relation, a hollow shaft rotatably supported by said plates, a spool mounted for rotation on said hollow shaft, means for driving said hollow shaft in rotation, a disc associated with one of said end plates and slidably keyed to one end of the hollow shaft, friction pad means fixed to the side of the spool adjacent to said one end plate in position to be frictionally engaged by said disc, a rod extending through said hollow shaft, spring means acting between said disc and the end of said rod adjacent to said one end of the hollow shaft to resiliently urge the disc toward said friction pad means, preset means for moving said rod axially to preset the maximum loading on said spring means, and cam means for moving said rod axially to vary the spring loading within the maximum loading established by the preset means without changing the setting of the preset means.

10. The invention as defined in claim 9 wherein said disc is slidably keyed to said hollow shaft with a loose fit so that it can tilt slightly on the hollow shaft to adjust itself so as to insure even contact with said friction pad means.

11. The invention as defined in claim 9 wherein said means for driving said hollow shaft in rotation comprises a pinion gear on the other end of said hollow shaft, an idler gear rotatably mounted on the other of said end plates and meshing with said pinion gear, a second pinion gear fixed to said idler gear for rotation therewith about a common axis, an internal gear rotatably mounted on said other end plate with the inwardly presenting teeth thereof meshing with said second pinion gear, and handle means for rotating said internal gear to rotatably drive said hollow shaft.

12. In a fishing reel, a pair of spaced end plates secured together in spaced relation, a hollow shaft rotatably supported by said plates, a spool mounted for rotation on said hollow shaft, means for driving said hollow shaft in rotation, a disc associated with one of said end plates and slidably keyed to one end of the hollow shaft, friction pad means fixed to the side of the spool adjacent to said one end plate in position to be frictionally engaged by said disc, a rod extending through said hollow shaft, heavy duty spring means acting between an outwardly presenting surface of said disc and the end of said rod adjacent to said one end of the hollow shaft to resiliently urge the disc toward said friction pad means, light duty spring means acting between the spool and an inwardly presenting surface of said disc for frictionally disengaging the disc from the friction pad means when the heavy duty spring is not sufficiently compressed to overcome the light duty spring so as to provide a free spool position, preset means for moving said rod axially to preset the maximum loading on said heavy duty spring means, and cam means for moving said rod axially to vary the spring loading within the maximum loading established by the preset means without changing the setting of the preset means.

13. In a fishing reel, a pair of spaced end plates secured together in spaced relation, a hollow shaft rotatably supported by said plates, a spool having end flanges mounted for rotation on said hollow shaft, means for driving said hollow shaft in rotation, a disk clutch on said hollow shaft in driving relation therewith, rod means extending through said hollow shaft, spring means at one end of said rod means, and means at the opposite end of said rod means for axially moving said rod means for loading said spring means for relatively moving said disk clutch from an axial position of complete disengagement to an axial position of maximum frictional engagement with one flange of said spool to provide a driving relation therebetween.

14. In a fishing reel, a pair of spaced end plates secured together in spaced relation, a hollow shaft rotatably supported by said plates, a spool mounted for rotation on said hollow shaft, means for driving said hollow shaft in rotation, a drag clutch on said hollow shaft in driving relation therewith, rod means extending through said hollow shaft, spring means at one end of said rod means, preset means at the opposite end of said rod means for axially moving said rod means for loading said spring means for relatively moving said drag clutch and spool into driving relation to each other to preset the maximum spring load, and cam means for moving said rod means axially to vary the spring loading within the maximum load established by said preset means without changing the setting of the preset means.

References Cited in the file of this patent

UNITED STATES PATENTS

| | | |
|---|---|---|
| 943,820 | Durkee et al. | Dec. 21, 1909 |
| 1,145,038 | Schramm | July 6, 1915 |
| 1,189,232 | Benjamin | July 4, 1916 |
| 1,547,238 | Russell et al. | July 28, 1925 |
| 1,980,345 | Long et al. | Nov. 13, 1934 |
| 2,220,519 | Grieten | Nov. 5, 1940 |
| 2,271,883 | Bannister | Feb. 3, 1942 |
| 2,329,381 | Bannister | Sept. 14, 1943 |
| 2,417,732 | Bland et al. | Mar. 18, 1947 |
| 2,462,365 | Crawford | Feb. 22, 1949 |
| 2,521,543 | Shakespeare et al. | Sept. 5, 1950 |
| 2,656,993 | Dukes | Oct. 27, 1953 |
| 2,896,876 | Bogar | July 28, 1959 |

FOREIGN PATENTS

| | | |
|---|---|---|
| 589,703 | France | Feb. 26, 1925 |